June 29, 1926.

J. RIHOSEK ET AL 1,590,907

AIR PRESSURE BRAKE

Filed Dec. 1, 1925  2 Sheets-Sheet 1

Inventors
J. Rihosek
R. L. Leuchter by Langner, Parry, Card & Langner
Atty's

June 29, 1926.
J. RIHOSEK ET AL
1,590,907
AIR PRESSURE BRAKE
Filed Dec. 1, 1925    2 Sheets-Sheet 2
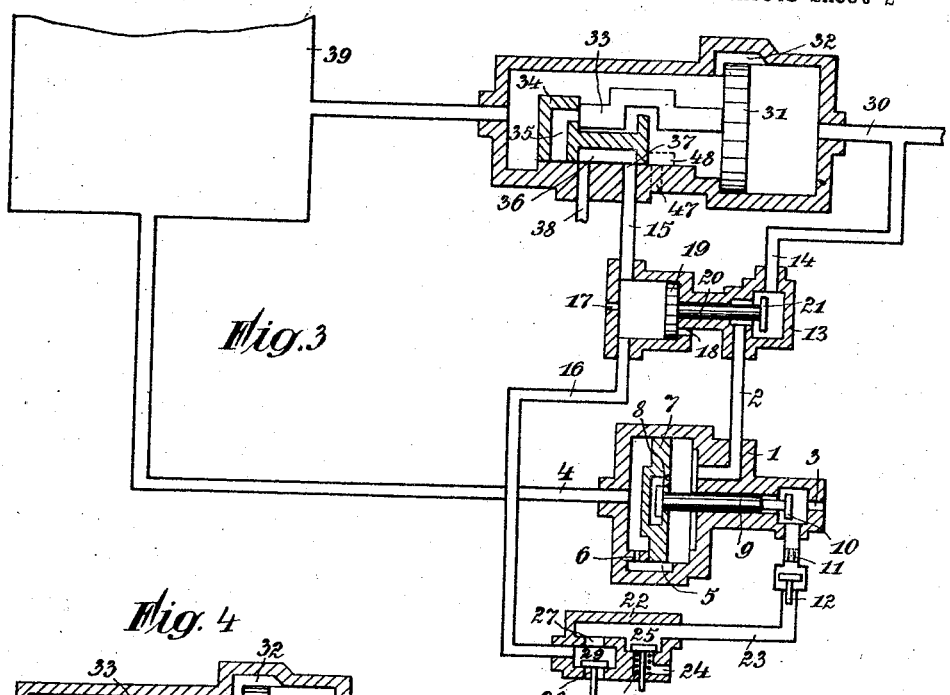
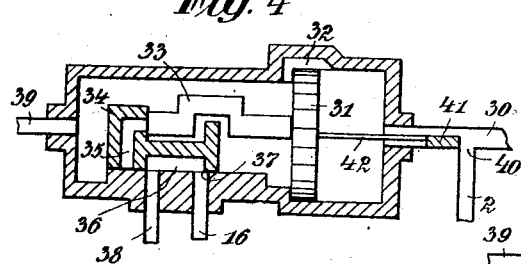
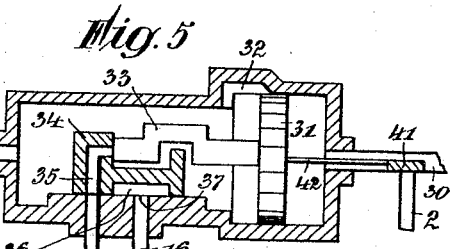
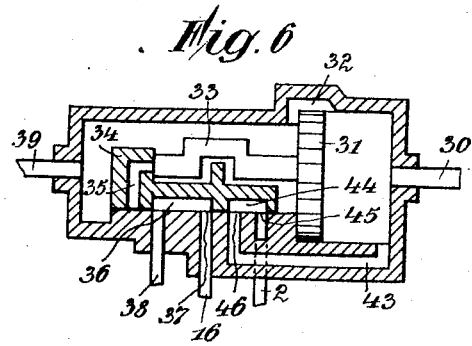
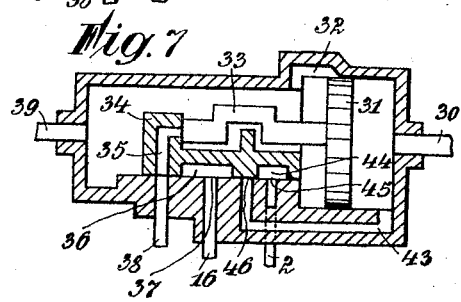
Inventors
J. Rihosek
R. L. Leuchter
by Langner, Parry, Card & Langner
Attys Patented June 29, 1926.

1,590,907

UNITED STATES PATENT OFFICE.

JOHANN RIHOSEK, OF VIENNA, AND RICHARD LUDWIG LEUCHTER, OF WEIDLIN-GAU-HADERSDORF, AUSTRIA, ASSIGNORS OF ONE-HALF TO GEBRUDER HARDY, MASCHINENFABRIK UND GIESSEREI A. G., OF VIENNA, AUSTRIA.

AIR-PRESSURE BRAKE.

Application filed December 1, 1925, Serial No. 72,566, and in Austria October 21, 1925.

Our invention relates to an arrangement for releasing step by step single chamber air pressure brakes in which a shutting off apparatus is made use of which interrupts the commenced escape from the brake cylinder as soon as the equalization of the pressures in the auxiliary reservoir and in the train pipe has taken place.

The essence of our invention consists in providing a separate brake release valve which controls the escape of air under pressure from the brake cylinder through the brake control valve to the atmosphere and is permanently under the action of the air pressure in the auxiliary reservoir, while in the opposite direction it is acted upon by the pressure in the train pipe only in the release position but is shut off from the train pipe when the brakes are applied.

Figure 1:
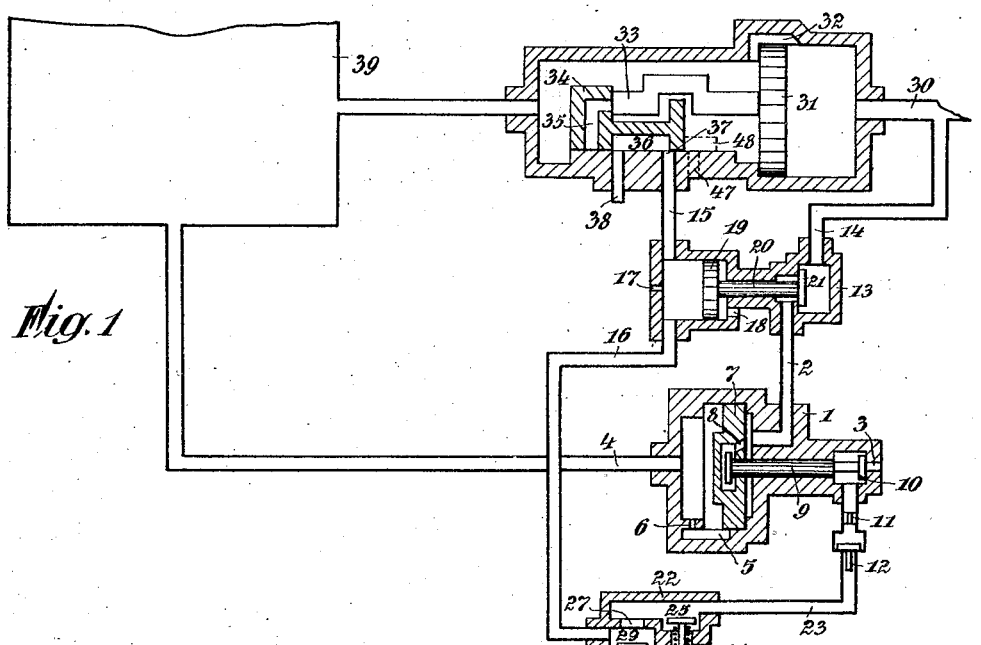
Figure 2:
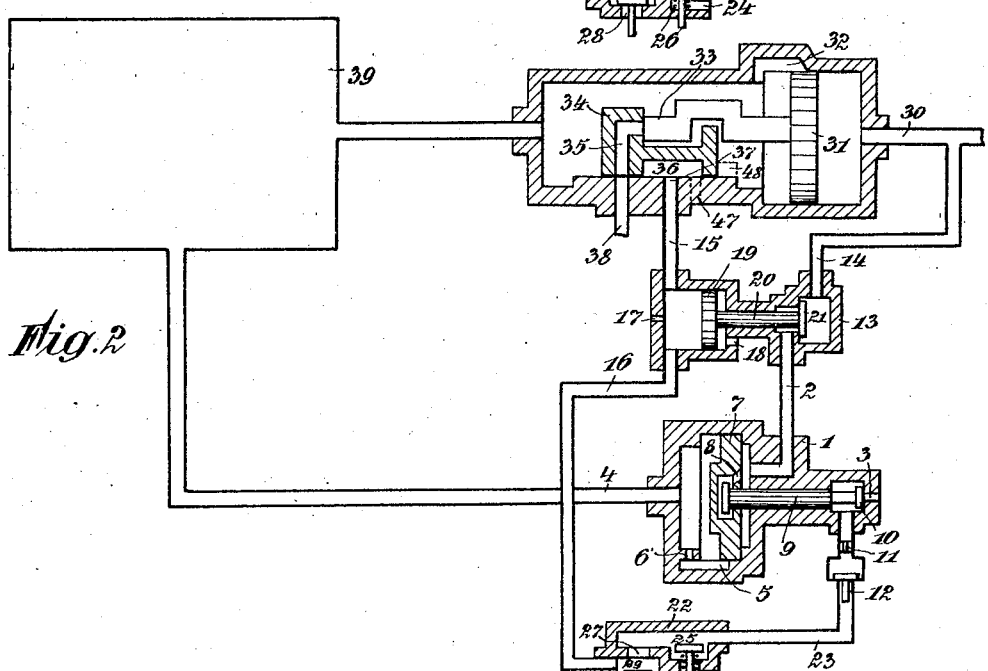

In the drawings a constructional form of the present arrangement is diagrammatically shown by way of example in Figs. 1, 2 and 3, the parts being in different positions.

Figs. 4 and 5 show a modification of the present arrangement and Figs. 6 and 7 show a further modification of the same.

The brake control valve with the piston 31, and piston rod 33, working in a cylinder and slide valve 34 are of the usual construction. One side of the piston is in permanently open connection with the train pipe 30, and the other with the auxiliary reservoir 39. The replenishing groove 32 in the cylinder establishes communication between the train pipe and the auxiliary reservoir, when the brake is released. The slide valve 34 is provided with a channel 35 and a recess 36 cooperating with two ports in the seat of the slide valve, one of the parts is connected to the escape conduit 38 for the air under pressure from the brake cylinder, while the other part is connected to the extension 15, 16, 23 of this conduit leading into the atmosphere.

The brake release control valve is formed by a cylinder 1 in which works a piston 7 or a diaphragm on one end of a rod 9. According to the invention one side of the piston 7 is in permanently open connection by a pipe 4 with the auxiliary reservoir 39 and the opposite end of the rod 9 carries a valve 10 controlling the communication between the escape conduit 23 for the air under pressure with an opening 3 leading into the atmosphere. The opposite side of the piston 7 is connected by a conduit 2, 14 with the train pipe, such conduit being open only on releasing the brakes but being shut off automatically near the end of the release period and remaining in the shut off condition, while the brakes are applied. This control of the conduit 2, 14 may be effected in various ways, preferably an auxiliary valve 21 is used for this purpose, which in the constructional form shown in Figs. 1 to 3 is arranged in a casing 13, which ends on the one side of the valve 21, the pipe 14 branching off the train pipe and on the other side of the valve 21 the pipe 2 leading to the brake releasing control valve. The valve 21 is mounted on one end of a rod 20 the other end of which carries a piston 19 working in a cylindrical chamber of the casing 13. To the end of the said cylindrical chamber, remotest from the valve 21 lead the pipes 15 and 16 and moreover on both sides of the piston 19 small holes 17, 18 are provided, which lead into the atmosphere.

The operation of the arrangement above described is the following:

When for bringing the brake plant into operative condition air under pressure is admitted into the train pipe the piston 31 of the brake control valve is driven into its release position to the left (see Fig. 1) the auxiliary reservoir 39 being charged with air under pressure by the replenishing groove 32.

Simultaneously air under pressure enters through the pipe 14 from the train pipe into the casing 13 and drives the auxiliary valve 21 and its piston 19 to the left. The admission of air under pressure to the brake release control valve is thus shut off by the valve 21 (Fig. 1).

When the brakes are fully released the brake cylinder is in communication with the atmosphere by the pipe 38, the recess 36, the channel 37, pipe 15, the auxiliary valve, the pipe 16 and further on by the passage 27, valve 25 of the release valve and bore 24, so that an unintentional application of the brakes owing to leakage in the brake control valve cannot take place. A further communication with the atmosphere is provided for by the opening 17. The position of the parts as shown in Fig. 1 is maintained until an application of the brakes is initiated.

When the engineer reduces the pressure in the train pipe the brake control valve moves as usual, into its braking position Fig. 2, the control slide valve breaking the communication between the pipes 38 and 15. The position of the auxiliary valve and of the brake release control valve are not altered thereby so that the brake release control valve remains shut off from the train pipe by the valve 21.

When the engineer increases the pressure in the train pipe the air impulse due thereto pushes the piston 31 of the brake control valve to the left into its release position Fig. 3. This movement is secured, even if the brake control valves are difficult to move or if the car is at a great distance from the locomotive and the increase of pressure is slight owing to the fact that the air is at first prevented from entering the brake release control valve by the valve 21 of the auxiliary valve. By the shifting of the piston 31, the brake cylinder is again connected with the auxiliary valve by the way above described and further on by the conduit 23 automatic valve 12 and throttle valve 11 with the brake release control valve.

The air under pressure escaping from the brake cylinder pushes the piston 19 of the auxiliary valve to the right overcoming the train pipe pressure acting on the rod thereby opening the valve 21, so that air under pressure can flow from the train pipe through the pipes 14 and 2 into the brake release control valve. At the same time in the release valve the valve 25 acted upon by a weak spring 26 only is forced onto its seat. As the auxiliary reservoir 39 is replenished only slowly by the narrow groove 32 of the brake control valve the pressure in front of the piston 7 of the brake release control valve may rise sufficiently to push the said piston to the left, Fig. 3, whereby on the one hand a second way to the auxiliary reservoir is opened leading through the replenishing groove 5 and the port 6, and on the other hand by lifting the valve 10 off its seat air under pressure is permitted to escape from the brake cylinder through the pipe 23, automatic valve 12, throttle valve 11 and opening 3.

The piston 7 remains in its extreme left hand position until it is pushed back to the right again by the action of the higher pressure on the one end of the piston rod 9 after equalization of pressures between the train pipe and auxiliary reservoir, the escape of air under pressure from the brake cylinder through the valve 10, being interrupted by the valve 25 being closed. The first brake releasing step is thus finished but the auxiliary valve remains in the position shown in Fig. 3 owing to properly dimensioning the transverse section of the piston 19 and the piston rod 20 as long as there is a sufficient air pressure in the brake cylinder. When the brakes have to be further released the pressure in the train pipe is again increased. The increased train pipe pressure pushes the piston 7 of the brake release control valve again to the left whereby the seat 3 leading to the atmosphere is opened and air under pressure escapes once more from the brake cylinder as above described.

Thus the brakes can be released step by step the succession of the individual steps being controlled by the engineer. When by the successive releasing steps the air pressure in the train pipe has been sufficiently raised and that in the brake cylinder has been reduced, the auxiliary valve returns into the position shown in Fig. 1. A further increase of pressure in the train pipe does no more affect the brake release control valve and the complete release of the brakes is secured by the opening 17 as also by valve 25 then opened by the spring 26 which cause the reduction of the air pressure in the brake cylinder to the atmospheric pressure.

The piston 7 and its rod 9 are connected with each other with axial lost motion for causing the brake release control valve to respond even to slight increases of pressure in the train pipe, since not the entire mass of the piston and piston rod used be accelerated at once; furthermore by this loose connection the simultaneous tight fitting of the piston 7 and of the valve 10, is secured when the brakes are released (Fig. 1).

If after a releasing step the brakes have to be applied again the slide valve 34 of the brake control valve moves into its braking position, breaking the connection of the brake cylinder with the auxiliary valve. The air under pressure from the brake cylinder still present in the escape conduit, escapes through the small opening 17 so that the pistons 19, 20 move again to the left and the valve 21, shuts off the brake release control valve from the train pipe the parts being thus brought into the position shown in Fig. 2.

During the entire release period air under pressure continuously and slowly escapes from the brake cylinder through the small opening 17 and this may be used if desired, to very slowly release the brakes without actuating the engineer's valve. The automatic valve 12 has for its purpose to prevent a back flow of the train pipe air into the brake cylinder, in case the piston rod 9 does not tightly fit its guide. The two openings 6 and 11 serve to cause the time required for releasing the brakes and the time required for replenishing the auxiliary reservoir to correspond to each other for reducing the exhaustibility of the brakes.

The small opening 17 may be dispensed with, if some other provision is made to cause air under pressure to escape from the pipes 13, 16, leading from the brake release valve when the parts are in braking position. This may be done by providing a port 47, indicated in dotted lines and leading in the braking position from the recess 36 in the slide valve to the atmosphere and controlled by an extension 48 of the slide valve such extension being likewise indicated in dotted line.

For enabling the brakes of a vehicle separated from the locomotive to be rapidly released by hand the two valves 25 and 29 are raised off their seats simultaneously with the normal release valve of air pressure brakes by a suitable device.

In Figs. 4 and 5 a constructional form of the arrangement according to the invention is shown, which permits of the use of the same brake release control valve as shown in Figs. 1 to 3 without the use of an auxiliary valve. For this purpose the piston 31 of the brake control valve is connected by a rod 42 with a slide valve 41, controlling the end 40 of the pipe 2 leading directly to the brake release control valve. When the brakes are released or during a releasing step the brake control valve is in the position shown in Fig. 4 in which the slide valve 41 uncovers the end 40 of the pipe 2. On applying the brakes, the brake control valve comes into the position shown in Fig. 5, in which the slide valve shuts off the end 40 of the pipe 2. The slide valve 40 therefore acts during braking and releasing the brakes in exactly the same way as the auxiliary valve in the construction shown in Figs. 1 to 2. A difference exists in so far only, as the auxiliary valve shuts off, while the brakes are applied, a communication between the train pipe and the brake release control valve (Fig. 1) whereas the slide valve 41 leaves this communication open when the brakes are released. In all other respects the construction and operation of the brake release control valve are exactly the same as those of the valve shown in Figs. 1 to 3.

The constructional form shown in Figs. 4 and 5 might also be such that a yielding connection is provided between the slide valve 41 and the piston 31 in such a manner that the piston 31, when moving into the braking position (Fig. 2) also moves the slide valve 41, whereas in the return movement into the release position the slide valve 41 is brought into the open position by a spring.

Finally the control of the pipe 2 might be effected by the slide valve 34 of the brake control valve. In this case a brake control valve of a special construction will have to be used as is seen from Figs. 6 and 7 of the drawing. The pipe 2 ends at 45 in the seat of the slide valve in which also ends at 46 a channel 43 coming from the right hand side of the piston 31. For controlling these openings 45 and 46 in the slide valve seat a separate recess 44 is provided in the slide valve 34. In the releasing position or when the brakes are released (Fig. 6), the pipe 2 and the channel 43 are connected with each other by the recess 44 in the slide valve, and therefore also the train pipe 30, with the brake release control valve, while in the braking position Fig. 7 the slide valve closes the port 46, and thereby shuts off the pipe 2 from the train pipe 30.

In the constructional forms shown in Figures 4 to 7 the escape conduit of the brake cylinder may be provided with a small hole similar to the hole 17 of Figures 1–3, for the purpose of securing a complete releasing of the brakes.

Apart from the possibility provided for by the present invention to release the brakes in steps as small as may be desired, each of such steps being followed if desired by a very slow complete releasing of the brakes or by a harder application of the brakes, which is of particulrly great importance in running downward on long inclines, the present invention also offers the advantage of great reliability, as springs subject to considerable strains, are fully dispensed with.

What we claim is:

1. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means being permanently acted upon, in one direction by the air under pressure in the auxiliary reservoir and means operatively connected with the said brake control valve and adapted to control the communication of the train pipe with the other side of the said means for actuating the brake release control valve, whereby the said communication is open in the braking position of the said brake control valve, and shut off in the releasing position of the said brake control valve.

2. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, an opening leading to the atmosphere between the brake control valve and the brake release control valve, means for actuating the brake release control valve, such means being permanently acted upon, in one direction by the air under pressure in the auxiliary reservoir and means operatively connected with the said brake control valve and adapted to control the communication of the train pipe with the other side of the said means for actuating the brake release control valve, whereby the said communication is open in the braking position of the said brake control valve, and shut off in the releasing position of the said brake control valve.

3. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means being permanently acted upon, in one direction by the air under pressure in the auxiliary reservoir and means operatively connected with the said brake control valve and adapted to control the communication of the train pipe with the other side of the said means for actuating the brake release control valve, whereby the said communication is open in the braking position of the said brake control valve, and shut off in the releasing position of the said brake control valve, and a communication between the train pipe and the auxiliary valve, controlled by the brake release control valve.

4. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, an automatic valve and a throttle valve preceding such opening, means for actuating the brake release control, such means being permanently acted upon, in one direction by the air under pressure in the auxiliary reservoir and means operatively connected with the said brake control valve and adapted to control the communication of the train pipe with the other side of the said means for actuating the brake release control valve, whereby the said communication is open in the braking position of the said brake control valve, and shut off in the releasing position of the said brake control valve.

5. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means being permanently acted upon, in one direction by the air under pressure in the auxiliary reservoir and auxiliary valve adapted to control the communication of the train pipe with the other side of the said means for actuating the brake release control valve and means for actuating such auxiliary valve, one side of such last named means being under the action of the air under pressure, flowing from the brake cylinder and the other side of such last named means being under the action of the air under pressure in the train pipe.

6. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means being permanently acted upon, in one direction by the air under pressure in the auxiliary reservoir, an auxiliary valve adapted to control the communication of the train pipe with the other side of the said means for actuating the brake release control valve and means for actuating such auxiliary valve, the last named means comprising a cylinder, a partition working in such cylinder a rod secured at one end to the said partition and having secured to its other end a valve body, the end of the cylinder remotest from the valve body, being interposed in a pipe, controlled by the brake control valve and leading to the brake release control valve, the side of the valve body remotest from the said partition being in permanently open connection with the train pipe, and openings on both sides of the said partition, and in permanently open connection with the atmosphere.

7. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means comprising a cylinder, a partition working in such cylinder and a rod connected with such partition with axial lost motion such partition being permanently acted upon, in one direction by the air under pressure in the auxiliary reservoir and means operatively connected with the said brake control valve and adapted to control the communication of the train pipe with the other side of the said means for actuating the brake release control valve, whereby the said communication is open in the braking position of the said brake control valve, and shut off in the releasing position of the said brake control valve.

8. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means being permanently acted upon, in one direction by the air under pressure in the auxiliary reservoir and means operatively connected with the said brake control valve and adapted to control the communication of the train pipe with the other side of the said means for actuating the brake release control valve, the said means adapted to control the communication of the train pipe with the other side of the means for actuating the brake release control valve comprising a valve connected to the brake control valve, whereby the said communication is open in the braking position of the said brake control valve, and shut off in the releasing position of the said brake control valve.

9. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, the brake release control valve interposed between the brake control valve and an opening leading to the atmosphere, means for actuating the brake release control valve, such means being permanently acted upon, in one direction by the air under pressure in the auxiliary reservoir and means operatively connected with the said brake control valve and adapted to control the communication of the train pipe with the other side of the said means for actuating the brake release control valve, the said means adapted to control the communication of the train pipe with the other side of the means for actuating the brake release control valve comprising a valve connected to the brake control valve, and two ports on the seat of the brake control valve one of such ports being connected to the brake release control valve and the other being connected to the train pipe the brake control valve being adapted to establish in its release position the communication between the said ports.

10. In an air pressure brake plant for railways the combination of a train pipe, a brake cylinder, a conduit leading from the brake cylinder to the brake control valve, a brake control valve and an auxiliary reservoir associated to such cylinder and a shutting off element adapted to interrupt the escape of air under pressure from the brake cylinder, a brake release control valve interposed between the brake control valve and an opening leading to the atmosphere, means for actuating the brake release control valve, such means being permanently acted upon, in one direction by the air under pressure, in the auxiliary reservoir and means operatively connected with the said brake control valve and adapted to control the communication of the train pipe with the other side of the said means for actuating the brake release control valve, whereby the said communication is open in the braking position of the said brake control valve, and shut off in the releasing position of the said brake control valve, and a port in the seat of the brake control valve communicating with the atmosphere and adapted to be connected by the slide valve of the brake control valve in its braking position with the pipe connecting the brake control valve with the brake release control valve.

In testimony whereof we have signed our names to this specification.

JOHANN RIHOSEK.
RICHARD LUDWIG LEUCHTER.